Patented Nov. 5, 1929

1,734,562

UNITED STATES PATENT OFFICE

KENNETH F. COOPER, OF GREAT NECK, NEW YORK.

SODIUM CYANIDE COMPOUND AND PROCESS OF PRODUCING THE SAME

No Drawing.    Application filed November 1, 1922.   Serial No. 598,430.

This invention relates to the production of sodium cyanide, which has a relatively high degree of purity, and has for its object to improve the products and the processes heretofore known.

With these and other objects in view, the invention consists in the novel steps and combinations of steps constituting the process and in the novel commercial product resulting from said process, all as will be more fully hereinafter disclosed and particularly pointed out in the claims.

In order that the precise invention may be clearly understood, it is said: In the U. S. Patent #1,359,257 for cyanide compound and process of producing the same, to Walter S. Landis, and dated November 16, 1920, there is disclosed a process of producing from commercial cyanamide a crude cyanide of calcium admixed with other impurities.

The process consists essentially in making a mixture of crude calcium cyanamide with a flux, such as sodium chloride, the amount of flux being considerably less than the amount of calcium cyanamide present, and heating the mixture to the fusing point. It is then quickly cooled to a temperature below 400° C., giving a flaky product containing a large amount of calcium cyanide, a smaller amount of soduim chloride, and minor amounts of lime, graphite and other impurities. When this product is dissolved in water there is obtained a solution of the chlorides and cyanides of sodium and calcium together with very small amounts of soluble impurities. This flaky product is used in the industries in place of sodium cyanide, for example, in the extraction of the precious metals from their ores, for the production of hydrocyanic acid, simple and complex cyanides and other compounds, as an insecticide, and for other uses.

On account of the peculiar nature of the calcium cyanide contained in said crude cyanide and the influence of the other constituents, many of which are insoluble, this patented product has not found application in certain industries which require a compartively pure alkali metal cyanide, and it is the object of this invention to produce a product from this crude cyanide as a raw material which can be used in those industries at present requiring high test, or comparatively pure cyanide compounds.

My invention consists in the following steps: I dissolve the crude patented cyanide in water and treat the solution with a sodium salt, such as, for example, sodium carbonate or sodium sulphate, in order to precipitate any soluble lime compounds present. This solution may be made by mixing the crude cyanide with a suitable amount of the sodium salt and treating the mixture with water, or the crude cyanide and the sodium salt may be added separately to the water. After solution and precipitation is complete, I filter off the insoluble matter and the precipitated lime salts, leaving a solution consisting essentially of sodium cyanide and sodium chloride.

If this solution should not contain a maximum concentration of cyanide and chloride salts, I remove water by evaporation. preferably under a vacuum, until I obtain a solution saturated with sodium cyanide. This evaporation is preferably so conducted that one obtains from the evaporator a solution that is saturated at 34.7° C. or approximately at 35° C. with sodium cyanide, and containing such quantities of soduim chloride as will not crystallize out upon the subsequent treatment about to be described.

I now take the solution from the evaporator and cool the same. Crystals of sodium cyanide dihydrate ($NaCN.2H_2O$) separate out as the solution is cooled, whereas the common salt stays behind in solution.

If the original solution contains less sodium chloride than is capable of being maintained in solution at the coldest temperature at which the operation is carried out, I may add sufficient sodium chloride to the original solution to bring the concentration up to such point that sodium chloride crystals will not separate out. By this means I may provide a maximum saturation of the solution with sodium chloride, in order that the solution pressures may cause the crystallization of a maximum quantity of sodium cyanide dihydrate.

By carrying out the process in the manner disclosed, involving the evaporation of a solution of sodium cyanide and sodium chloride to such concentration that the resulting solution is just saturated with sodium cyanide dihydrate at the transition temperature of 34.7° C. and is just saturated with sodium chloride at a temperature just below the lowest point to which I subsequently cool the solution, one is enabled to crystallize out hydrated crystals of sodium cyaide substantially uncontaminated with sodium chloride, and therefore have left a mother liquor containing practically no sodium cyanide. In other words, I thus obtain a substantially complete separation of the two constituents.

I then separate the crystals from the mother liquor by the usual methods, preferably by a centrifuge.

I next take the crystals of hydrated sodium cyanide and transfer them into a vacuum dryer where they melt in their water of crystallization, which latter I evaporate off and obtain a dry sodium cyanide of high purity as the end product. I treat this said product in any desired or usual manner to prepare it for the market. I may either briquette it or fuse it.

As an example of carrying out this process, I may take 100 pounds of the crude patented cyanide carrying approximately 47 pounds of calcium cyanide. I mix this with approximately 60 pounds of soda ash and dissolve the same in about 250 pounds of water. This gives a solution containing about 15 per cent of sodium cyanide and 10 to 12 per cent of sodium chloride. I concentrate this solution until the cyanide content is raised to approximately 20 per cent when it will then also contain about 20 per cent of sodium cyanide and 16 per cent of sodium chloride. I now cool the concentrated solution down to about minus 15° C. which practically separates out all of the sodium cyanide present in the form of hydrated crystals, as above described.

I next centrifuge these crystals as dry as possible and send the same to a vacuum dryer where I remove the water of crystallization by evaporation, and obtain a final product analyzing about 85 to 90 per cent of pure anhydrous sodium cyanide.

It is evident that those skilled in the art may vary the foregoing procedure without departing from the spirit of the invention and I therefore do not wish to be limited to the above disclosure except as may be required by the claims.

What I claim is:

1. The process of producing sodium cyanide from a crude cyanide compound containing calcium cyanide and a substantial percentage of sodium chloride, which consists in preparing from said compound a solution containing essentially sodium cyanide and sodium chloride; concentrating said solution; crystallizing out the sodium cyanide dihydrate present; and recovering the crystallized hydrated sodium cyanide; and producing from the latter anhydrous sodium cyanide; substantially as described.

2. A process of producing a sodium cyanide from a crude cyanide compound derived from crude calcium cyanamide and containing a substantial percentage of sodium chloride consisting in preparing a solution of the crude cyanide in water; precipitating any calcium present; filtering the solution to remove insoluble compounds present; concentrating the solution; cooling the concentrated solution to separate sodium cyanide dihydrate; and recovering said sodium cyanide from said dihydrate, substantially as described.

3. A process of producing sodium cyanide from a crude cyanide compound derived from crude calcium cyanamide and containing a substantial percentage of sodium chloride consisting in dissolving the crude cyanide in water; adding thereto a soluble salt of sodium capable of precipitating the soluble calcium compounds present; removing the insoluble compounds present; concentrating the solution at a temperature above 35° C.; cooling the concentrated solution to a temperature sufficiently low to cause a separation of a substantial portion of the sodium cyanide dihydrate present, and recovering sodium cyanide from the latter, substantially as described.

4. A process of producing sodium cyanide from a crude cyanide compound derived from crude calcium cyanamide consisting in dissolving the crude cyanide in water; adding to the solution sufficient sodium chloride to provide a substantially saturated solution thereof at the lowest temperature of the subsequent operations; adding to the solution a soluble salt of sodium capable of precipitating any soluble calcium compounds present; removing any insoluble compounds present; concentrating the resulting solution at a temperature above 35° C.; cooling the concentrated solution to a temperature substantially lower than 35° C. to separate out the sodium cyanide dihydrate present; and recovering and drying the latter, substantially as described.

5. A process of producing sodium cyanide from a crude cyanide compound derived from crude cyanamide consisting in dissolving the same in water; adding to the solution a sodium salt capable of precipitating any soluble calcium compound present; filtering off the precipitated and insoluble compounds in the solution; adding sodium chloride to the solution; concentrating the resulting solution; cooling the concentrated solution to separate out the sodium cyanide dihydrate present; and drying the latter under a reduced pressure, substantially as described.

6. A process of producing sodium cyanide from a crude calcium cyanide containing a substantial percentage of sodium chloride which consists in dissolving the crude cyanide in water, precipitating and removing the calcium, concentrating the solution until the concentration of sodium cyanide dihydrate therein is equivalent to approximate saturation at 35° C. and cooling the same to a temperature at which the sodium cyanide will precipitate while leaving the sodium chloride in solution.

In testimony whereof I affix my signature.

KENNETH F. COOPER.